April 5, 1960     M. A. TUVE ET AL     2,931,897
RADIOSONDE
Filed Aug. 10, 1943                    4 Sheets-Sheet 1
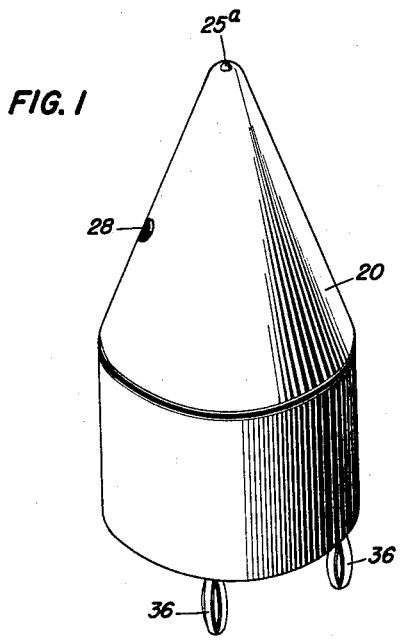
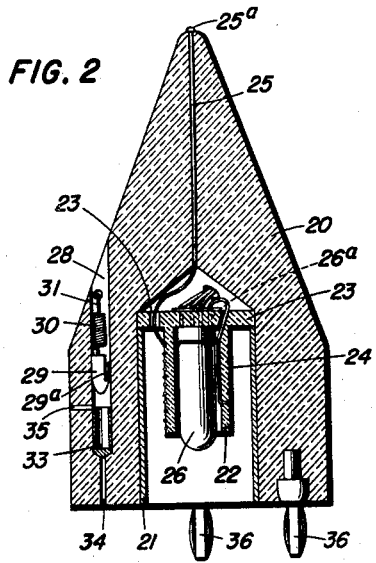
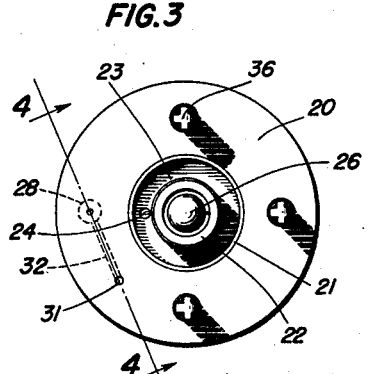
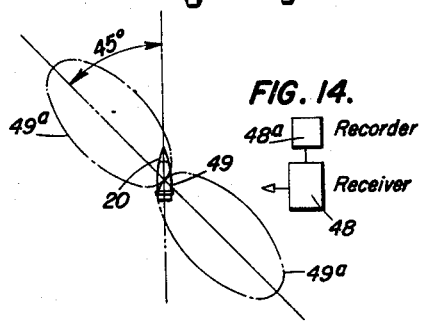
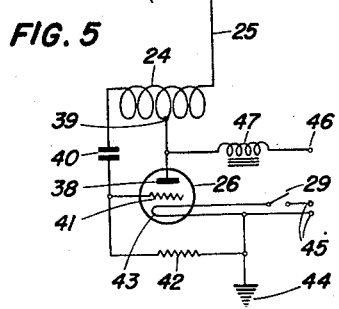
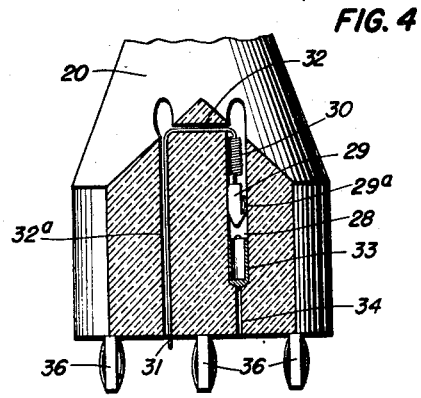
INVENTORS
MERLE A. TUVE
JAMES A. VAN ALLEN
BY
ATTORNEY April 5, 1960
M. A. TUVE ET AL
2,931,897
RADIOSONDE
Filed Aug. 10, 1943
4 Sheets-Sheet 2
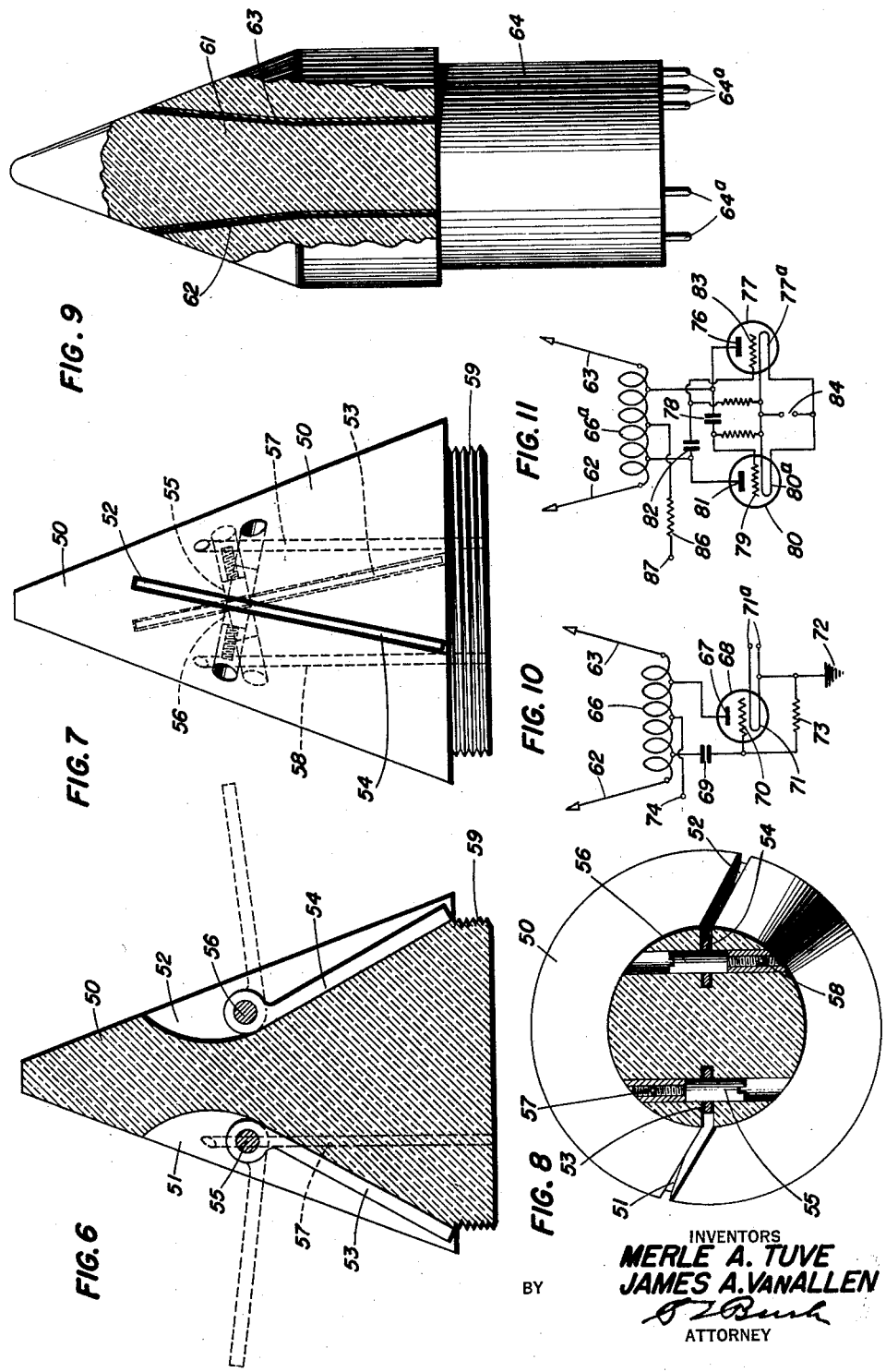
INVENTORS
MERLE A. TUVE
JAMES A. VanALLEN
ATTORNEY

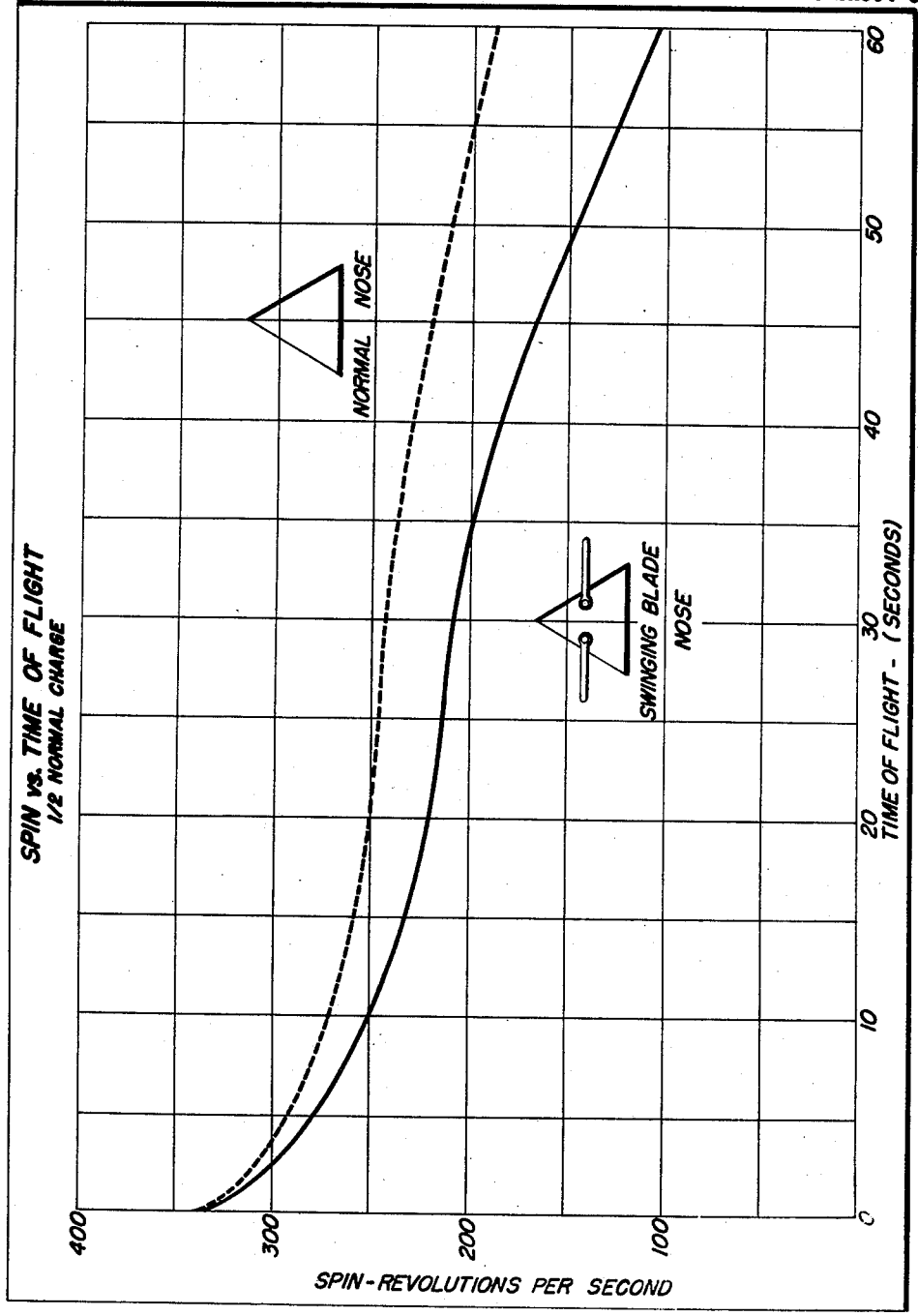

April 5, 1960

M. A. TUVE ET AL 2,931,897

RADIOSONDE

Filed Aug. 10, 1943

INVENTORS
MERLE A. TUVE
JAMES A. VAN ALLEN
BY
ATTORNEY

United States Patent Office 2,931,897
Patented Apr. 5, 1960

2,931,897
RADIOSONDE

Merle A. Tuve, Chevy Chase, Md., and James A. Van Allen, Mount Pleasant, Iowa, assignors to the United States of America as represented by the Secretary of the Navy Application August 10, 1943, Serial No. 498,104

6 Claims. (Cl. 250—17)

This invention relates to electromagnetic wave or radio apparatus and has particular reference to a novel apparatus of this type including a radiosonde which is rugged and compact in construction and operates accurately to transmit information concerning the flight of a projectile, or the like, in which the sonde is mounted.

One object of the invention resides in the provision of a radio apparatus including a ground receiver and a radiosonde which is mounted in a projectile for transmitting to the receiver from the projectile in flight quantitative information relating to phenomena associated with the flight of the projectile.

Another object of the invention is to provide a radiosonde adapted to be propelled through the air in a projectile and upon which the effect of the projectile moving through the air is the same as would be produced if it were possible to mount the sonde in a wind tunnel capable of creating a wind velocity equal to the velocity of the projectile, for permitting the measurement of aerodynamic drag, pressures on portions of the surface of the projectile, etc.

A further object of the invention is to provide a sonde so constructed that it results in only a negligible alteration in the ballistics of the projectile in which it is mounted, and which is of such rugged construction that it is capable of withstanding the forces incident to acceleration and flight of the projectile.

Still another object of the invention is to provide a radiosonde adapted for use in measuring the aerodynamic drag on projecting parts of a projectile.

An additional object of the invention resides in the provision of a radiosonde for use in measuring the speed of a projectile, for testing batteries, switches and other components, and for making various other tests and observations.

A further object of the invention is to provide a radiosonde, by the use of which it will be possible to effect aerodynamic measurements at velocities far above the velocities of sound.

These and other objects of the invention may be better understood by reference to the accompanying drawings, in which Fig. 1 is a perspective view of one form of the new sonde;

Fig. 2 is a longitudinal sectional view of the sonde shown in Fig. 1;

Fig. 3 is a bottom view of the sonde shown in Figs. 1 and 2;

Fig. 4 is a sectional view on the line 4—4 in Fig. 3;

Fig. 5 is a schematic view of one form of circuit employed in the sonde;

Fig. 6 is a longitudinal sectional view of part of another form of the sonde, showing the antenna elements;

Fig. 7 is a side view of the device shown in Fig. 6;

Fig. 8 is a transverse sectional view of the device shown in Figs. 6 and 7;

Fig. 9 is a side view of still another form of the sonde with part of the casing broken away;

Figs. 10 and 11 are schematic views of other forms of circuits which may be employed in the sonde;

Figs. 12 and 13 are charts illustrating the operation of the sonde, and

Fig. 14 is a schematic view of a projectile carrying the sonde, showing the radiation characteristics of the sonde, and the ground receiver for receiving signals from the sonde.

Figure 13:
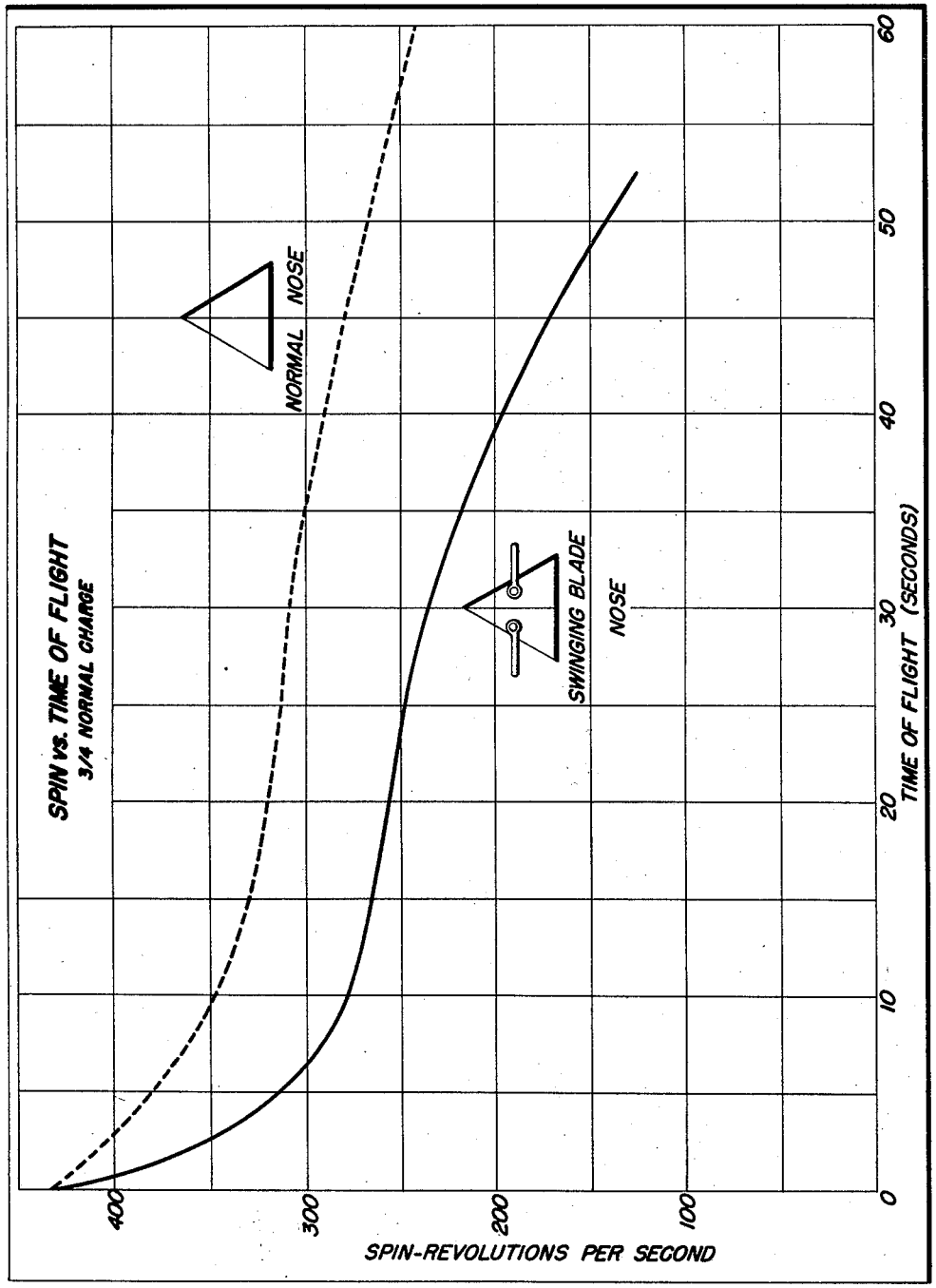

The radio apparatus of our invention comprises, in addition to a ground receiver, a radiosonde having three units in the projectile, as follows:

(1) A compact radio transmitter, that is, a radio-frequency oscillator coupled to a suitable antenna.

(2) A modulator unit for altering the amplitude of the radiated signal from the transmitter in a predetermined manner.

(3) A battery for supplying current to the transmitter and the modulator.

Referring to Figs. 1 to 5, inclusive, the transmitter of the apparatus is housed in a frusto-conical casing 20 made of a suitable insulating material, such as Lucite. At its rear or base end, the casing 20 is adapted to be received in the front end of a projectile casing so that the tapered portion of casing 20 forms the nose of the projectile. The base portion of the casing 20 is formed with a cylindrical bore extending axially into the casing and having a liner 21, which may be made of copper or other metal, the liner serving to facilitate moulding of the casing. The bore contains a generally cylindrical form 22 made of insulating material and disposed within the liner 21 in concentric, spaced relation thereto. At its upper end, the form 22 is closed and has an outwardly extending flange 23 which is clamped between the inner end of liner 21 and the adjacent end of the bore. An oscillator coil 24 is wound on the cylindrical surface of the form 22 and is connected at its inner end to an antenna 25 extending through an axial passage in the casing 20 to the apex or nose end thereof. The outer end of the antenna may be upset, as shown at 25a, to secure the antenna against movement in the casing. A vacuum tube 26 is mounted within the form 22 so that the base of the tube faces the nose of casing 20, and the tip faces the base of the casing. The tube 26 is provided with the usual prongs 26a which fit into sockets in the closed end of form 22. The vacuum tube 26 is designed to withstand the forces incident to firing the projectile from a gun.

The casing 20 has a longitudinal bore 28 offset laterally from the liner 21 and containing a setback switch which may be of any desired form. As shown, the setback switch comprises a plunger 29 suspended on a coil spring 30 and having a hook 29a. The spring 30 is connected to a wire 31 extending through a transverse passage 32 in the casing and into another longitudinal passage 32a, the end of the wire 31 projecting from the base of the casing so that it may be connected into the circuit of the transmitter, as will be described in detail presently. The plunger 29 is disposed opposite a metal cylinder 33 seated in the bottom of the bore 28, and when the projectile is fired from a gun, the resulting force of setback causes plunger 29 to move into the cylinder 33 against the action of spring 30 and thereby close the switch. The hook 29a on the plunger serves to lock the latter in the cylinder 33 so as to hold the switch closed after the force of setback has been dissipated. The cylinder 33 is adapted to be connected in the transmitter circuit through a passage 34 extending through the bottom of the casing. It will be understood that before the projectile is fired from a gun, the spring 30 maintains plunger 29 out of engagement with the cylinder 33, whereby the switch is held open. A conductor 35 extends outwardly to the side of the casing from cylinder 33 and may be used to short-circuit the switch for any purpose, as, for example, to test the sonde. The casing 20 is provided on its base with plugs 36 for making electrical connection with a battery or other unit in the projectile to the rear of the casing, the plugs being connected to the electrical components in the casing by suitable wiring (not shown).

The vacuum tube 26 comprises a plate element 38 (Fig. 5) connected to the oscillator coil 24 intermediate its ends, as shown at 39. The end of coil 24 opposite its connection to antenna 25 is coupled through a grid condenser 40 to a control grid 41 in the vacuum tube, and the control grid is connected through a grid bias resistor 42 to the positive side of the tube filament 43, which is grounded to the metal casing of the projectile, as shown at 44. A current source 45 is adapted to energize the filament 43 through the setback switch 29 which normally maintains the filament circuit open to prevent operation of the sonde until the projectile is fired. The positive side of a B battery 46 is connected through a choke coil 47 to the connection between plate 38 and coil 24. The resistor, condenser and choke coil of the oscillator, which is of the conventional Colpitts type, are mounted in the casing 20 in bores similar to the bore 28. The point 39 at which plate 38 is connected to the oscillator coil is determined with a view to insuring proper loading of the oscillator.

The antenna 25 may be of any other form than that shown. We have employed various types of antennae, for example, loop, axial dipole, transverse dipole, and combinations thereof, and by selecting the proper type of antenna, the distribution of radiated energy may be controlled in accordance with the information which it is desired to obtain concerning the flight of the projectile. For example, an axial dipole sends no signal backward or forward along the axis of the projectile but sends its strongest signal in directions perpendicular to the axis; a loop antenna sends a uniformly strong signal out in all directions in its plane, no signals at right angles to its plane, and signals of intermediate strengths at intermediate angles, etc.

In operation, a sensitive radio receiver 48 (Fig. 14) and an associated recording unit 48a are located on the ground in position to receive signals radiated from the sonde while the projectile 49 (Fig. 14) carrying the sonde is in flight. The exact position of the ground receiver relative to the prescribed trajectory of the projectile is determined by the radiation pattern selected for the sonde, the pattern in Fig. 14 being indicated by the reference numeral 49a. By way of example, it may be stated that a sonde having the following characteristics has been used successfully:

Radiation=1 milliwatt
Frequency=125 megacycles

Permanent records of the signals transmitted from the sonde and received by the radio receiver 48 may be obtained on the recorder 48a in the field and analyzed at leisure. It will be apparent that the speed of rotation of the projectile 49 through a portion of its flight may be determined from the pulsations in intensity of the signals as indicated on the recorder 48a. The carrier waves emitted by the sonde may be modulated by any suitable modulating means (not shown). For example, forces acting on various parts of the nose or other section may be used to modulate the oscillator. Also, the modulating means may be in the form of a switch operable by centrifugal force or by a force of setback.

A modified form of the radiosonde is shown in Figs. 6, 7, and 8. As there shown, the sonde comprises a generally conical body 50 made of insulating material and having a pair of diametrically opposed slots 51 and 52 in its side wall. The slots 51 and 52 extend upwardly from the base of the body through substantially three-quarters of the length thereof and, as shown in Fig. 7, are inclined at a slight angle to the axis of the body.

Antenna blades 53 and 54 are pivotally mounted at their upper ends in the slots 51 and 52 on screws 55 and 56, respectively. The pivot screws 55 and 56 extend generally transversely through the slots near the upper ends thereof, the axis of each screw being normal to the plane of its blade. The blades 53 and 54, which may be made of dural, or the like, are movable outwardly on their respective pivots 55 and 56 by centrifugal force from inoperative positions within the slots, as shown in full lines in Fig. 6, to operative positions in which the blades project from the body, as shown in dotted lines in Fig. 6. By arranging the slots 51 and 52 at an angle with respect to the axis of body 50, as previously described, the wind resistance of the blades in their operative position is substantially reduced.

The body 50 of the sonde is provided with longitudinal bores 57 and 58 which are offset from the axis of the body and communicate, respectively, with the openings for receiving the pivot screws 55 and 56 for the antenna blades. The purpose of the bores 57 and 58 is to receive conductors for connecting the blades, through the respective screws 55 and 56, to the ends of the tank coil of the oscillator. The oscillator includes the same components as that shown in Fig. 5 and is mounted in a suitable housing (not shown) which may be screwed on a threaded boss 59 extending from the base of the body 50. It will be understood that the circuit arrangement of the oscillator may be different from that shown in Fig. 5.

The sonde shown in Fig. 9 comprises a generally frusto-conical casing 61 made of insulating material and having two generally longitudinal bores containing antenna elements 62 and 63, respectively, which may be in the form of wire strands. The antennae 62 and 63 extend from the bottom of the body 61 to points on the conical surface of the body near its apex. The antenna elements are disposed on opposite sides of the axis of the body, and their lower portions extend parallel to the axis while their upper portions are inclined obliquely outwardly from the axis. Although the antenna elements 62 and 63 and the bores containing them may, if desired, be straight, it has been found that by inclining the upper end portions of the elements, a greater radiation of radio frequency energy in the desired direction may be obtained. It will be observed that the antenna elements 62 and 63, as shown, are arranged in the form of horns and are contained entirely within the body 61.

A cylindrical block 64 is mounted on the base of the body 61 and contains an oscillator unit connected to the antenna elements 62 and 63, the block having suitable plugs 64a by which the oscillator may be connected to a battery unit (not shown) in the projectile. The oscillator unit circuit may be of any desired form, but we have illustrated two preferred forms of the circuit in Figs. 10 and 11.

Referring to Fig. 10, the oscillator there shown comprises a tank coil 66 connected at its ends to the antenna elements 62 and 63, respectively. Near its connection to the antenna element 63, the coil 66 is connected to the plate 67 of a vacuum tube 68 similar to the tube 26. The coil 66 near its opposite end is coupled through a grid condenser 69 to the control grid 70 of the vacuum tube. The tube filament 71 is adapted to be energized from a suitable current source 71a, and the positive side of the filament is grounded to the casing of the projectile, as shown at 72. A grid bias resistor 73 is connected between the positive side of the filament and the grid 70. Intermediate its ends, the tank coil 66 is connected to the positive side 74 of a B battery.

In the circuit shown in Fig. 11, which is of the push-pull type, the tank coil 66a, near its connection to the antenna element 63, is connected to the plate 76 of a vacuum tube 77. The plate 76 is coupled through a grid condenser 78 to the control grid 79 of a second vacuum tube 80, and the plate 81 of the second tube is coupled through a grid condenser 82 to the control grid 83 of the first tube 77. The filaments 77a and 80a of the two vacuum tubes are included in a common circuit, which is energized from a suitable current source 84. The tank coil 66a is connected intermediate its ends through a resistor 86 to the positive terminal 87 of a B battery.

The practical use of the new sonde is illustrated in the diagrams of Figs. 12 and 13 showing the variation of the rate of spin of the sonde and projectile with the time of flight. Figs. 12 and 13 show in full lines the variation of the rate of spin with the time of flight of a projectile provided with a sonde having the swinging blade type of antenna illustrated in Figs. 6 to 8, inclusive. The dotted lines in Figs. 12 and 13 show the variation of the rate of spin with time of flight of a sonde equipped with an antenna of the horn type illustrated in Fig. 9. The experiments recorded in Fig. 12 were made on the basis of a one-half normal propellant charge for the projectile, while the experiments recorded in Fig. 13 were made on the basis of a three-quarters normal propellant charge for a projectile. A comparison of the relative performances of the horn and swinging blade types of antennae may be readily made by examining the curves shown in Figs. 12 and 13.

We claim:

1. A radiosonde for a projectile, which comprises a body of generally conical shape, an antenna mounted in the body substantially axially thereof, and an oscillator in the body and connected with the antenna and responsive to phenomena associated with the projectile when in flight for broadcasting information concerning such phenomena.

2. A radiosonde for a projectile, which comprises a substantially conical body of insulating material, said body having a chamber and an axial bore, an antenna mounted in the bore, and an oscillator in the chamber and connected with the antenna quantitatively responsive to phenomena associated with the projectile when in flight for broadcasting information concerning such phenomena.

3. In a radiosonde for a rotating projectile, an antenna unit including a body having substantially oppositely disposed slots, antenna elements, means pivotally mounting the elements in the slots, and means for leading electromagnetic waves through the body to said mounting means.

4. In a radiosonde for rotating projectiles, an antenna unit including a body having generally vertically extending slots disposed at an angle to the axis of the body, antenna elements, means pivotally mounting the elements in the slots, and means for leading to said elements energy to be radiated by the antenna unit.

5. In a radiosonde, an antenna unit including a body of substantially frusto-conical shape and having a pair of bores, an oscillator mounted on the base portion of the body, and antenna elements in the bores and connected with the oscillator.

6. In a radiosonde, an antenna unit comprising a block of insulating material of substantially frusto-conical shape, said block being formed with a pair of bores having their corresponding lower end portions disposed in parallel spaced relation and their corresponding upper end portions diverging, said bores extending from points on the base of the block to points along the conical wall of said block, and antenna elements in the bores.

References Cited in the file of this patent

UNITED STATES PATENTS

| 1,780,369 | Snow | Nov. 4, 1930 |
| 2,281,284 | Hammond | Apr. 28, 1942 |
| 2,283,919 | Diamond et al. | May 26, 1942 |
| 2,293,949 | Potter | Aug. 25, 1942 |

FOREIGN PATENTS

| 399,543 | Great Britain | Oct. 9, 1933 |